United States Patent
Bucharzewski et al.

(10) Patent No.: US 9,723,788 B2
(45) Date of Patent: Aug. 8, 2017

(54) SUPPORT WHEEL ASSEMBLY FOR A PICK-UP OF AN AGRICULTURAL MACHINE

(75) Inventors: Marek Bucharzewski, Plock (PL); Mariusz Choluj, Plock (PL); Danny Claeys, Oedelem (BE); Sandor Van Vooren, Sijsele-Damme (BE)

(73) Assignee: CNH Industrial America LLC, New Holland, PA (US)

( * ) Notice: Subject to any disclaimer, the term of this patent is extended or adjusted under 35 U.S.C. 154(b) by 723 days.

(21) Appl. No.: 13/699,601

(22) PCT Filed: Apr. 26, 2011

(86) PCT No.: PCT/EP2011/056541
§ 371 (c)(1),
(2), (4) Date: Nov. 21, 2012

(87) PCT Pub. No.: WO2011/151113
PCT Pub. Date: Dec. 8, 2011

(65) Prior Publication Data
US 2013/0076103 A1 Mar. 28, 2013

(30) Foreign Application Priority Data

May 31, 2010 (BE) .............................. BE2010/0329

(51) Int. Cl.
*A01D 89/00* (2006.01)

(52) U.S. Cl.
CPC ......... *A01D 89/006* (2013.01); *A01D 89/004* (2013.01)

(58) Field of Classification Search
CPC ................. A01D 89/00; A01D 89/004; A01D 89/006–89/008; A01D 41/10; A01D 39/00; A01D 39/005; A01D 43/02; A01D 75/002; A01F 15/00
USPC .......................................... 56/17.2, 341, 364
See application file for complete search history.

(56) References Cited

U.S. PATENT DOCUMENTS

| | | | | |
|---|---|---|---|---|
| 2,818,269 A | * | 12/1957 | Dixon .................... | A01B 63/16 172/250 |
| 3,408,802 A | * | 11/1968 | Slates .................... | A01D 45/24 56/364 |
| 3,468,112 A | * | 9/1969 | Landgrebe ....................... | 56/364 |
| 3,525,537 A | | 8/1970 | Honnold | |
| 3,684,026 A | * | 8/1972 | Reuter et al. .................... | 56/341 |
| 3,984,969 A | * | 10/1976 | Yatcilla .......................... | 56/341 |
| 4,125,339 A | * | 11/1978 | Pittinger et al. ............. | 403/348 |
| 4,187,666 A | * | 2/1980 | McIlwain ....................... | 56/341 |

(Continued)

FOREIGN PATENT DOCUMENTS

| | | | | |
|---|---|---|---|---|
| AT | 362236 B | * | 4/1981 | ........... A01D 89/004 |
| CN | 2500088 Y | | 7/2002 | |

(Continued)

*Primary Examiner* — Thomas B Will
*Assistant Examiner* — Joan D Misa
(74) *Attorney, Agent, or Firm* — Patrick M. Sheldrake

(57) ABSTRACT

The assembly comprises a beam, a support wheel rotatably mounted on an axle carried by the beam with a stub shaft. A hole in the frame of the baler which receives the stub shaft includes at least one radial recess dimensioned to permit the radially projecting arm to pass through the hole when aligned with the recess, the arm preventing the stub shaft from moving axially relative to the frame when misaligned with the recess.

7 Claims, 2 Drawing Sheets

(56) References Cited

U.S. PATENT DOCUMENTS

| | | | | |
|---|---|---|---|---|
| 4,317,327 | A | * | 3/1982 | Doering ................. A01D 42/02 172/622 |
| 4,495,756 | A | * | 1/1985 | Greiner et al. ................. 56/364 |
| 4,689,941 | A | * | 9/1987 | Doering ......................... 56/396 |
| 4,829,755 | A | * | 5/1989 | Nance ................. A01D 34/001 56/17.1 |
| 5,086,847 | A | * | 2/1992 | Meiners ................. A01B 63/22 172/240 |
| 5,819,516 | A | * | 10/1998 | Anderson et al. .............. 56/341 |
| 5,845,471 | A | * | 12/1998 | Seegert et al. ................. 56/17.2 |
| 6,244,027 | B1 | * | 6/2001 | McClure et al. ............... 56/364 |
| 6,370,854 | B1 | * | 4/2002 | Moore ........................... 56/17.2 |
| 6,601,375 | B1 | * | 8/2003 | Grahl et al. ................... 56/16.6 |
| 6,810,653 | B2 | * | 11/2004 | Derscheid ............ A01D 75/185 56/364 |
| 7,162,950 | B2 | * | 1/2007 | McClure et al. ................. 100/8 |
| 7,448,196 | B2 | * | 11/2008 | Schrag et al. .................. 56/341 |
| 7,621,194 | B1 | * | 11/2009 | Tyree ................................ 74/16 |
| 7,650,741 | B2 | * | 1/2010 | Graber et al. .................. 56/364 |
| 7,716,910 | B2 | * | 5/2010 | Woodford ....................... 56/364 |
| 7,743,595 | B2 | * | 6/2010 | Savoie ................. A01D 89/002 56/341 |
| 7,958,943 | B2 | * | 6/2011 | Vachal .......................... 172/259 |
| 8,141,651 | B1 | * | 3/2012 | Christianson ............ A01G 1/12 172/21 |
| 2002/0017092 | A1 | | 2/2002 | Josset et al. |
| 2009/0235472 | A1 | * | 9/2009 | Johnson et al. .................. 15/83 |
| 2013/0076103 | A1 | * | 3/2013 | Bucharzewski et al. ......... 301/1 |

FOREIGN PATENT DOCUMENTS

| | | | |
|---|---|---|---|
| CN | 201256549 Y | 6/2009 | |
| EP | 0383121 B1 * | 11/1993 | ........... A01D 78/105 |
| EP | 1179294 A1 * | 2/2002 | |
| WO | WO 2012072436 A1 * | 6/2012 | |

* cited by examiner

SUPPORT WHEEL ASSEMBLY FOR A PICK-UP OF AN AGRICULTURAL MACHINE

This application is the US National Stage filing of International Application Serial No. PCT/EP2011/056541 filed on Apr. 26, 2011 which claims priority to Belgium Application BE2010/0329 filed May 31, 2010, each of which is incorporated herein by reference in its entirety.

TECHNICAL FIELD

The present invention relates to a pick-up support wheel assembly for an agricultural machine, such as a baler or a forage harvester.

BACKGROUND ART

A baler is an agricultural machine, usually towed by a tractor, that picks straw, or other crop material, from the ground and ties it into round or square bales. The straw will usually have been deposited on the ground in windrows, or swaths, by a combine harvester.

The mechanism used to pick up straw substantially comprises a frame supported on wheels on the ground and carrying a rotating hoe and a chute for guiding the straw picked up by the hoe towards a baling chamber.

The width of the hoe should be as wide as possible to maximise the width of the tract of land from which straw is gather during each pass of the baler. However, the support wheels must be positioned outside the area swept by the hoe and it is their distance apart that determines the maximum width of the baler. As any vehicle that is to be towed on public roads must comply with maximum width requirements, leaving the support wheels in place during transportation of the baler places a limit on the width of the pick-up hoe.

It has therefore been proposed previously to remove the pick-up support wheels from the frame of the pick-up during transportation. However, in known balers where this is possible, the removal and mounting of the pick-up support wheels is a cumbersome task requiring tools.

For example, EP 1179294 discloses a wheel assembly for supporting a frame of a pick-up of an agricultural baler on the ground, which, in common with the present invention, comprises a beam, a support wheel rotatably mounted on an axle carried by the beam, a stub shaft on the beam receivable in a hole in the frame for pivotably and releasably mounting the beam on the frame of the pick-up and a locking mechanism for locking the beam in a desired position relative to the frame to set the height of the frame above the ground. In the latter patent, after inserting the stub shaft in aligned holes in the frame, it is necessary to mount a retaining collar on the end of the stub shaft projecting from the inboard side of the frame. To do this, the operator is required first to gain access to the inboard end of the stub shaft while it is in situ. After slipping the retaining collar over the end of the stub shaft, a pin must be inserted through diametrically aligned holes in the collar and the stub shaft and finally a fastening must be fitted to the pin to retain it within the collar.

SUMMARY OF INVENTION

The present invention seeks to provide a pick-up wheel assembly which simplifies the tasks of mounting and dismounting the support wheels and avoids the need for tools.

In accordance with the present invention, there is provided a wheel assembly for supporting a frame of a pick-up of an agricultural baler on the ground, comprising a beam, a support wheel rotatably mounted on an axle carried by the beam, a stub shaft on the beam receivable in a hole in the frame for pivotably and releasably mounting the beam on the frame of the pick-up and a locking mechanism for locking the beam in a desired position relative to the frame to set the height of the frame above the ground, characterised in that a retention plate is provided on the end of the stub shaft having at least one arm projecting beyond the circumference of the stub shaft and the hole in the frame for receiving the stub shaft includes at least one radial recess dimensioned to permit the at least one radially projecting arm to pass through the hole when aligned with the at least one recess, the at least one arm preventing the stub shaft from moving axially relative to the frame when misaligned with the at least one recess.

Conveniently, the retention plate has a plurality of circumferentially spaced radially projecting arms, resembling a star shape, the hole in the frame having a cross section with a complementary outline.

It is preferred for the arms not to be equally spaced circumferentially, so that the retention plate only aligns fully with the hole in the frame once in every full rotation of the retention plate through 360°. If three arms are evenly distributed about the circumference of the retention plate, this would allow secure retention only over an angular rotation range of 120°, but this may suffice in practice as it exceeds the adjustment range of the beam.

BRIEF DESCRIPTION OF DRAWINGS

The invention will now be described further, by way of example, with reference to the accompanying drawings, in which.

DETAILED DESCRIPTION

Figure 1:
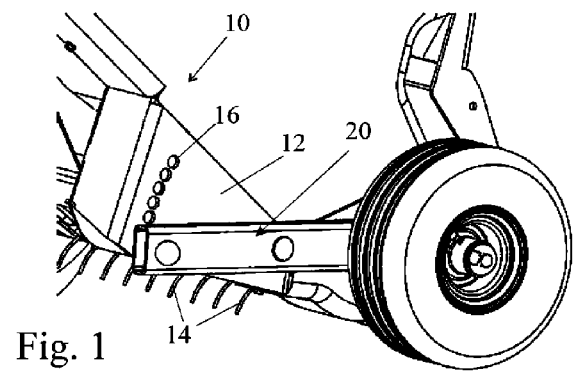
FIG. 1 shows a support wheel assembly mounted on the frame of a pick-up of a baler, as viewed from the outboard side of the frame.

FIG. 1 shows a pick-up 10 of a baler having a frame 12 carrying a rotary hoe of which only the tines 14 can be seen in the drawing. The design and function of the pick-up 10 may be conventional and need not be described within the present context. It suffices to understand that the pick-up is towed along the ground and that the frame 12 is supported by an adjustable and removable wheel assembly 20. The adjustability of the wheel assembly 20 is to allow setting of the height of the hoe above the ground and its removability is to enable the width of the baler to be reduced when it is towed on a public road.

Figure 2:
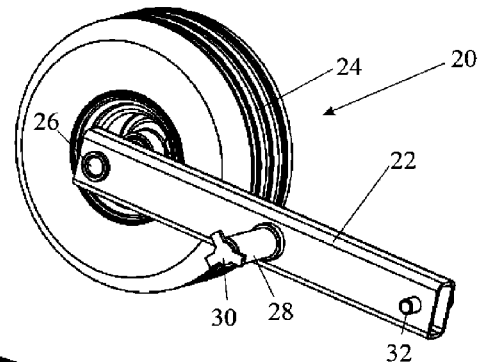
FIG. 2 is a perspective view of the support wheel assembly when removed from the frame, the drawing showing its side facing the frame of the pick-up.

The support wheel assembly is shown in FIG. 2 separated from the frame 12 of the baler pick-up 10. The wheel assembly 20 comprises a beam 22 and a wheel 24 rotatable about an axle 26 secured to one end of the beam 22. Intermediate its end, the assembly 20 comprises a stub shaft 28, which lies on the opposite of the beam 22 from the wheel 24. A star-shaped retention plate 30 with three radially projecting arms is fixed to the inboard end of the stub shaft 28. At its opposite end from the wheel 24, the beam 22 carries a resiliently retractable locking pin 32 which can engage in one of several holes 16 formed in the frame 12.

Figure 4:
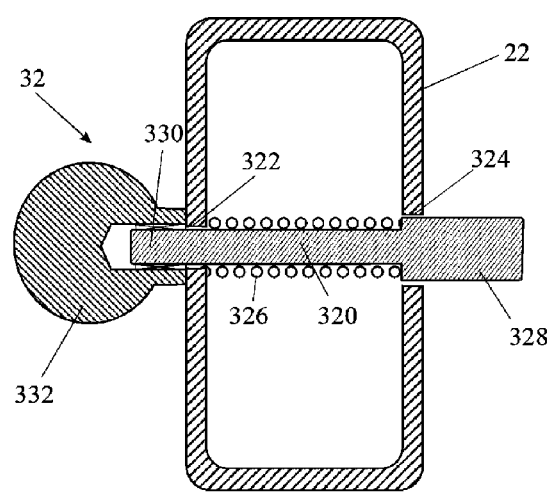
FIG. 4 is a section through the beam in a plane passing through the axis of the locking pin.

As shown in FIG. 4, the locking pin 32 has a shank 320 that passes through two aligned holes 322 and 324 in the beam 22. The hole 324 on the frame side of the beam 22 is larger than the other hole 322 so that it can accommodate a compression spring 326 surrounding the shank 320. The spring 326 is compressed between the beam 22 and a head 328 of larger diameter than the shank 320 that engages in one of the holes 16. The pin 32 is assembled into the beam 22 by first placing the spring 326 over the shank 320 and inserting the shank 320 into the hole 324 until its end 330, which is externally threaded, protrudes through the hole 322. An actuating knob 332 that is used to retract the pin 32 is then screwed onto the threaded end 330 of the shank 320.

Figure 3:
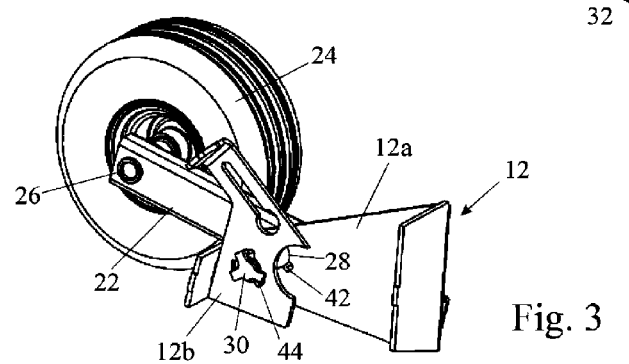
FIG. 3 is perspective of the support wheel assembly when mounted on the frame of a pick-up as viewed from the inboard side of the frame with parts of the frame being cut away to show the manner in which the support wheel assembly is mounted on and retained by the frame of the pick-up.

As shown in FIG. 3, when the support wheel assembly 20 is mounted on the frame 12, the stub shaft passes through two aligned holes 42 and 44 in two spaced plates 12a and 12b of the frame 12 which support the outboard and inboard end of the stub shaft 28, respectively. The holes 42 and 44 are of the same shape as the retention plate 30 and dimensioned to allow the retention plate 30 to pass through them with clearance when the arms of the retention plate 30 are aligned with the radial recesses of the holes 42 and 44.

To fit the support wheel assembly 20 to the frame 12, the stub shaft 28 is offered to the holes 42 and 44 and the assembly 20 is rotated about the stub shaft 28 to the extent necessary to align the retention plate 30 with the hole 42. This requires the assembly 20 to be rotated anticlockwise as viewed in FIG. 2 and is effected by raising the wheel 24 above ground level.

With the wheel assembly held in this orientation, the stub shaft 28 is next pushed into position, the retention plate 30 passing first through the hole 42 in the plate 12a then the similar hole 44 in the plate 12b. Once the stub shaft 28 has passed through both the plates 12a and 12b, the wheel is released and it drops to ground level the stub shaft 28 is rotated into the position shown in FIG. 3. In this position, the retention plate 30 is misaligned with the hole 44 and prevents the wheel assembly 20 from being withdrawn from the frame 12.

With the wheel assembly 20 securely attached to the frame 12, the desired height of the frame 12 above the ground can be set by rotating the wheel assembly 20 to its desired position about the stub shaft 28 and locking it in position by manually retracting the locking pin 32 and releasing to engage under the action of its own spring force in the appropriate one of the holes 16 in the frame 12.

Removal of the support assembly can also be achieved without the use of any tools. After release of the locking pin 32, the wheel 24 is raised off the ground to rotate the stub shaft 28 to the position in which the star-shaped retention plate 30 aligns with the hole 44. The stub shaft 28 may then be slid out to release the support wheel assemble 20 from the frame 12.

It will be appreciated that it is only necessary for the retention plate to have one radially projecting arm but it has been found that three distributed arms are to be preferred in that they provide improved retention without unduly weakening the holes 42 and 44 which withstand the forces acting on the stub shaft. If the three arms are evenly spaced, the beam can only be rotated through 120° without risk of it separating from the frame 12. For this reason it is preferred for the spacing to be uneven so that alignment of the arms with the hole in the frame only occurs in one relative angular position.

The invention claimed is:

1. A wheel assembly for supporting a frame of a pick-up of an agricultural machine on the ground, comprising:
    a beam,
    a support wheel rotatably mounted on an axle carried by the beam,
    a stub shaft on the beam receivable in a hole in the frame for releasably mounting the beam on the frame of the pick-up such that the beam is pivotable about the stub shaft with respect to the frame when received in the hole, and
    a locking mechanism connected to the beam for selectively radially locking the beam in a desired position relative to the frame to set the height of the frame above the ground; and
    a retention plate on the end of the stub shaft having at least one arm radially projecting beyond the circumference of the stub shaft, and the hole in the frame for receiving the stub shaft including at least one radial recess dimensioned to permit the retention plate and the at least one radially projecting arm to pass through the hole when aligned with the at least one recess in a first position, the at least one arm movable to a second position when inserted through the hole preventing the stub shaft from moving axially relative to the frame when misaligned with the at least one recess.

2. A wheel assembly as claimed in claim 1, wherein the retention plate has a plurality of radially projecting arms that are distributed circumferentially, to resemble a star shape, the hole in the frame having a cross section with a complementary outline.

3. A wheel assembly as claimed in claim 2, wherein the retention plate has three arms.

4. A wheel assembly as claimed in claim 1, in combination with the pickup of the agricultural machine, wherein the beam of the wheel assembly is removably mounted to the frame such that stub shaft extends through the hole to a side of the frame of the pickup and the locking mechanism is engaged with the frame.

5. A wheel assembly as claimed in claim 4, wherein the first position corresponds to a raised position of the wheel with respect to the frame and the second position corresponds to a lowered position of the wheel with respect to the first position.

6. A wheel assembly as claimed in claim 1, wherein the stub shaft is positioned between the axle and locking mechanism along the length of the beam.

7. A wheel assembly as claimed in claim 1, wherein the hole for the stub shaft extends through a first and second aligned plate of the frame.

* * * * *